US009377201B2

(12) United States Patent
Fanella et al.

(10) Patent No.: US 9,377,201 B2
(45) Date of Patent: Jun. 28, 2016

(54) FORGED FUEL INJECTOR STEM

(71) Applicants: Robert James Fanella, San Diego, CA (US); Donald Lee Seybert, Lakeside, CA (US); Thomas John Chipman Rogers, San Diego, CA (US); Anthony Fahme, Chula Vista, CA (US)

(72) Inventors: Robert James Fanella, San Diego, CA (US); Donald Lee Seybert, Lakeside, CA (US); Thomas John Chipman Rogers, San Diego, CA (US); Anthony Fahme, Chula Vista, CA (US)

(73) Assignee: Solar Turbines Incorporated, San Diego, CA (US)

( * ) Notice: Subject to any disclaimer, the term of this patent is extended or adjusted under 35 U.S.C. 154(b) by 591 days.

(21) Appl. No.: 13/763,425

(22) Filed: Feb. 8, 2013

(65) Prior Publication Data

US 2014/0223913 A1     Aug. 14, 2014

(51) Int. Cl.
| F02C 1/00 | (2006.01) |
| F23R 3/34 | (2006.01) |
| B21K 3/00 | (2006.01) |
| F02C 7/22 | (2006.01) |

(52) U.S. Cl.
CPC . *F23R 3/343* (2013.01); *B21K 3/00* (2013.01); *F02C 7/222* (2013.01); *Y10T 29/49323* (2015.01)

(58) Field of Classification Search
CPC ............ F23R 3/283; F23R 3/286; F23R 3/60; F02C 7/20; F23D 17/002
See application file for complete search history.

(56) References Cited

U.S. PATENT DOCUMENTS

| 3,159,971 | A | * | 12/1964 | Moebius | ................ | F23R 3/283 |
| | | | | | | 285/136.1 |
| 3,213,523 | A | * | 10/1965 | Boehler | .................... | F23C 5/10 |
| | | | | | | 228/174 |
| 3,662,959 | A | * | 5/1972 | Sample, Jr. | ................ | F23R 3/28 |
| | | | | | | 239/533.2 |
| 3,720,378 | A | * | 3/1973 | Davis, Jr. | ............... | F23D 17/002 |
| | | | | | | 239/397 |
| 4,453,384 | A | * | 6/1984 | Pask | ........................ | F23D 11/12 |
| | | | | | | 60/737 |
| 4,735,044 | A | | 4/1988 | Richey et al. | | |
| 5,218,824 | A | | 6/1993 | Cederwall et al. | | |
| 5,701,732 | A | * | 12/1997 | Nesbitt | ................... | F02C 7/232 |
| | | | | | | 60/39.094 |
| 6,141,968 | A | | 11/2000 | Gates et al. | | |
| 6,427,930 | B1 | * | 8/2002 | Mei | ........................ | F23R 3/286 |
| | | | | | | 239/398 |
| 6,935,117 | B2 | | 8/2005 | Cowan | | |
| 7,497,012 | B2 | | 3/2009 | Prociw et al. | | |
| 2007/0119177 | A1 | | 5/2007 | McMasters et al. | | |
| 2009/0256003 | A1 | | 10/2009 | McMasters et al. | | |
| 2010/0154424 | A1 | | 6/2010 | Twardochleb et al. | | |

FOREIGN PATENT DOCUMENTS

JP       2003139327       5/2003

* cited by examiner

*Primary Examiner* — Gerald L Sung
(74) *Attorney, Agent, or Firm* — Procopio, Cory, Hargreaves & Savitch LLP

(57) ABSTRACT

A gas turbine engine fuel injector stem includes a single piece of material with a flange, a center body, a gas gallery, and a fluid passage. The flange includes a cylindrical shape, a plurality of mounting holes and a handle hole. The center body extends from a flange cap in the flange axial direction. The gas gallery is adjacent the center body and distal to the flange. The gas gallery includes a ring shape oriented transverse to the flange and includes a gallery opening. The fluid passage extends through the flange, center body, and gas gallery and is in flow communication with the gallery opening.

17 Claims, 8 Drawing Sheets

FORGED FUEL INJECTOR STEM

TECHNICAL FIELD

The present disclosure generally pertains to gas turbine engines, and is more particularly directed toward a fuel injector with a forged fuel injector stem.

BACKGROUND

Gas turbine engines include compressor, combustor, and turbine sections. The combustor section includes multiple feel injectors. The fuel injectors include a stem with multiple pieces such as a stem bar, bar tubes, a gas gallery, and a flange.

U.S. Pat. No. 6,141,968 to Gates et al. discloses a stem member for a gas turbine fuel nozzle. The stem member for a gas turbine fuel nozzle includes inlet and outlet ends which are respectively adapted to be connected to a fuel adapter which is coupled to a fuel injector and a tip assembly having at least one spray orifice for atomizing fuel into a combustion chamber. The stem member further includes at least one slot which is sealed throughout the length thereof by a slot cover so as to define at least one feel conduit for directing fuel flow from the inlet end to the outlet end of the stem member. An outer shield can be disposed outwardly of the stem member to protect and limit the transfer of heat from the surroundings to the stem member.

The present disclosure is directed toward overcoming one or more of the problems discovered by the inventors.

SUMMARY OF THE DISCLOSURE

A gas turbine engine fuel injector stem is disclosed. The fuel injector stem includes a single piece of material with a flange, a center body, a gas gallery, and a fluid passage. The flange includes a plurality of mounting holes and a handle hole. The flange includes a cylindrical shape. The center body extends from a cap of the flange in the axial direction of the flange. The gas gallery is adjacent the center body and distal to the flange. The gas gallery includes a ring shape oriented transverse to the flange. The gas gallery includes a gallery opening. The fluid passage extends through the flange, center body, and gas gallery. The fluid passage is in flow communication with the gallery opening.

A method for manufacturing a gas turbine engine fuel injector stem is also disclosed. The method includes forging a material into a workpiece. The workpiece includes a top disk, a body, and a lower disk. The top disk includes a cylindrical shape. The body extends from a base of the top disk and includes a cuboid shape. The lower disk is connected to the body, distal to the top disk. The lower disk includes a cylindrical shape oriented transverse to the top disk. The method, also includes machining the top disk into a flange having a plurality of mounting holes and a handle hole. The method also includes machining the lower disk into a gas gallery having a ring shape. Machining the lower disk into a gas gallery includes removing material to form a gallery opening. The method further includes machining a fluid passage through the flange, the body, and a portion of the gas gallery to the gallery opening. The fluid passage is in flow communication with the gallery opening.

DETAILED DESCRIPTION

The systems and methods disclosed herein include a single body gas turbine engine fuel injector stem composed of a single piece of material. In embodiments, the single piece of material includes a flange, a center body, and a gas gallery. One or more fluid passages extend through the flange, the center body and a portion of the gas gallery. A single body fuel injector stem may reduce manufacturing time and costs. For example, manufacturing the fuel injector stem disclosed may not include brazing or other similar processes. A single body fuel injector stem may also increase durability of the fuel injector stem. The single body may reduce the effects of thermal expansion within the fuel injector stem.

Figure 1:
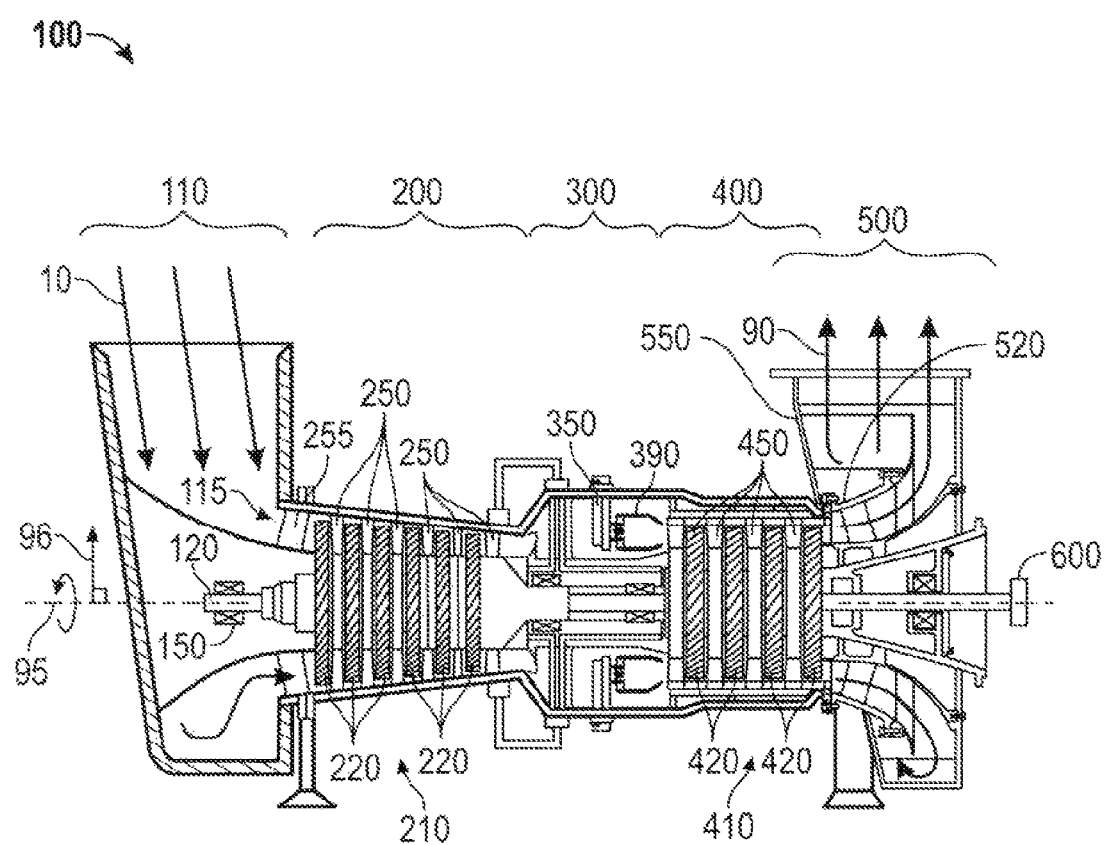
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages, inlet guide vanes 255 axially precede the first compressor stage.

The combustor 300 includes one or more injectors 350, each including a single body injector stem ("stem") 370 (shown in FIGS. 2-5) and one or more combustion chambers 390.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 520 and an exhaust collector 550.

Figure 2:
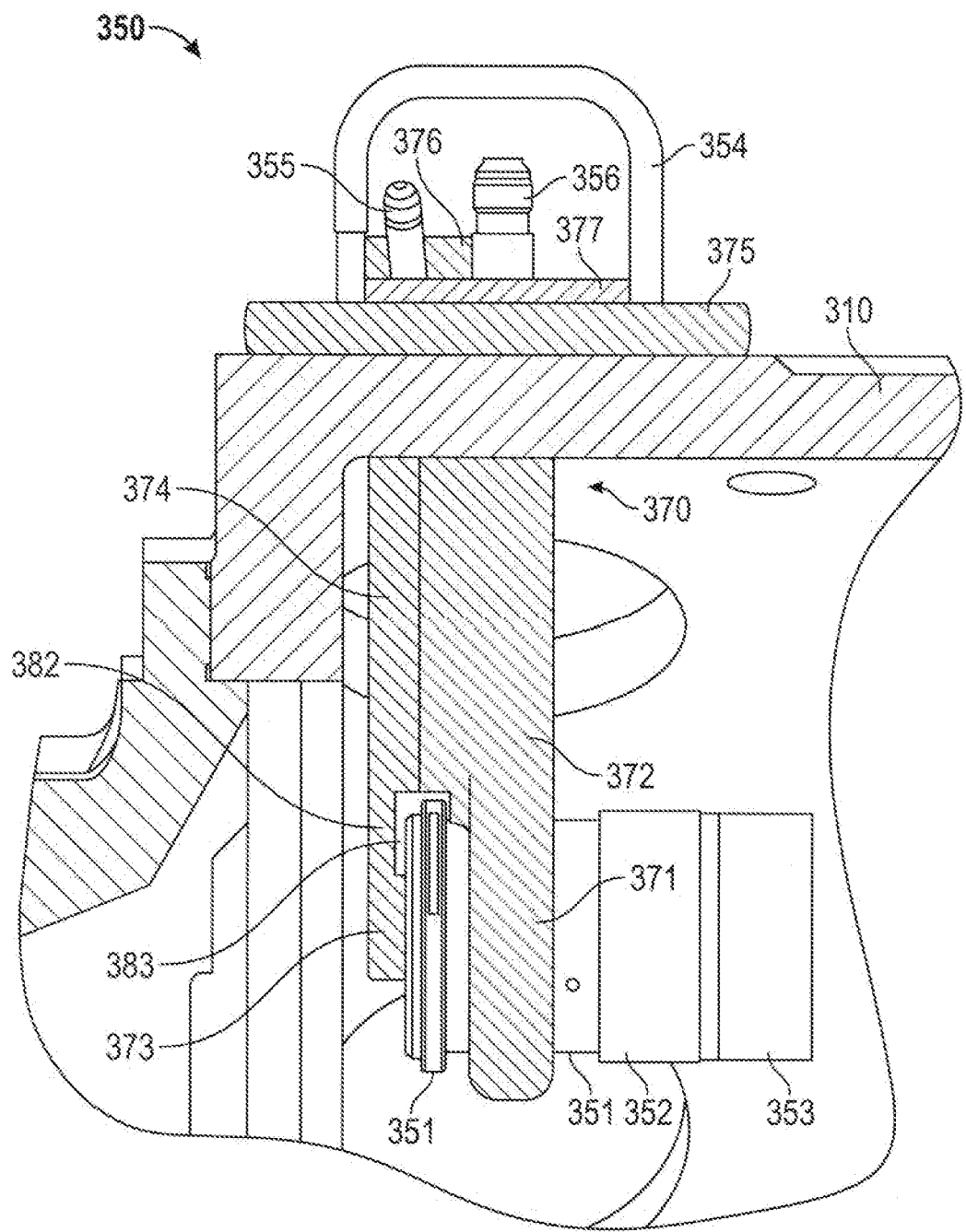
FIG. 2 is a cross-sectional view of a portion of the combustor section of the gas turbine engine 100 of FIG. 1.

FIG. 2 is a cross-sectional view of a portion of the combustor of the gas turbine engine 100 of FIG. 1. As illustrated in FIG. 2, case 310 surrounds the combustor. Injector 350 extends through case 310 and is fastened to case 310. Injector 350 includes stem 370, one or more handles 354, swirler assembly 351, and barrel 352. Stem 370 is a single integral piece of material that includes case mating flange ("flange") 375, center body 372, and gas gallery 371. Center body 372 extends from flange 375 to gas gallery 371.

Flange 375 fastens to case 310. Handle 354 may attach to flange 375. Swirler assembly 351 attaches to stem 370 at gas gallery 371. Swirler assembly 351 is in flow communication with stem 370. Swirler assembly 351 may attach to barrel 352 and may be in flow communication with barrel 352. Barrel 352 includes barrel end 353 which may be adjacent to the combustion chamber.

Figure 3:
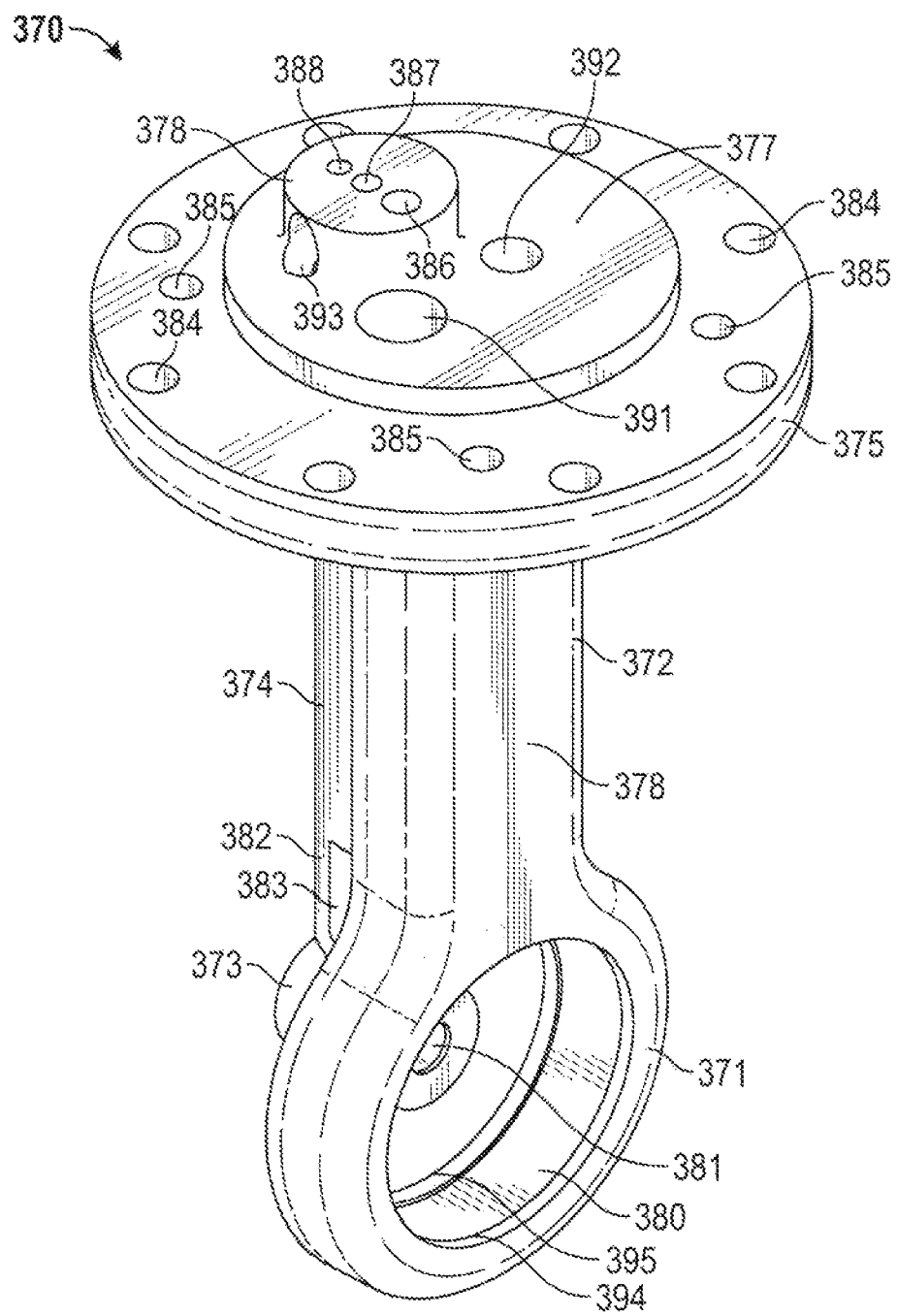
FIG. 3 is a perspective view of the fuel injector stem of FIG. 2.
Figure 4:
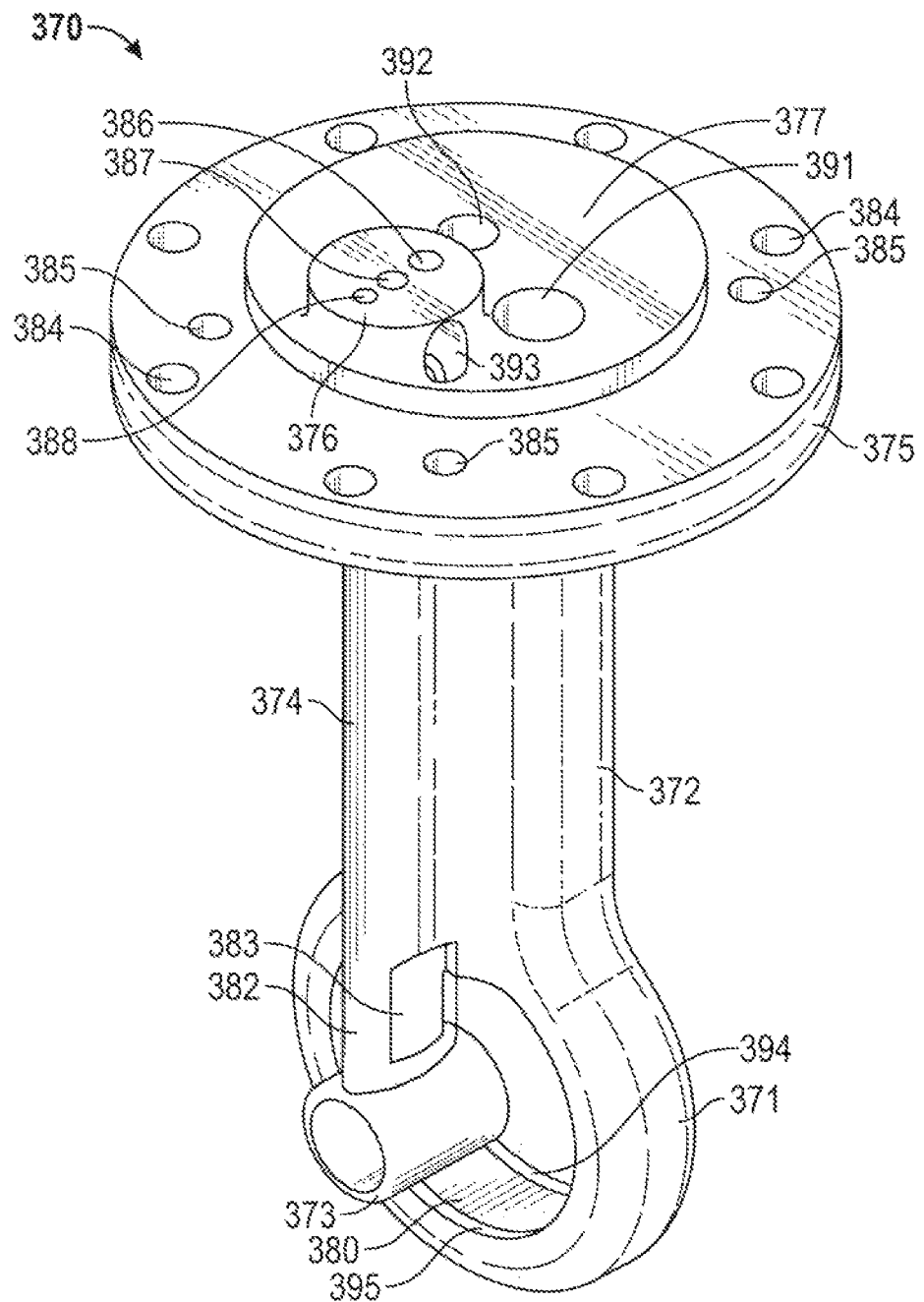
FIG. 4 is another perspective view of the fuel injector stem of FIG. 2.

FIG. 3 is a perspective view of stem 370 of FIG. 2. FIG. 4 is another perspective view of stem 370 of FIG. 2. Referring to FIGS. 2, 3, and 4, stem 370 may also include pilot body 374 and pilot funnel 373. Pilot body 374 extends from flange 375 along the back of center body 372, opposite stem front 378. Pilot body 374 may include strut 382 located adjacent gas gallery 371. Pilot funnel 373 may be cylindrical and is a located behind gas gallery 371. Gas gallery 371 includes gallery opening 380, which may be a cylindrical opening. The centers of pilot tunnel 373 and gallery opening 380 may be aligned. Pilot funnel 373 may attach to pilot body 374 at strut 382. Strut 382 may extend across gallery opening 380 to pilot funnel 373. Strut 382 may include strut flats 383 on each side of strut 382. Strut flats 383 may be parallel surfaces that are inset from the outer surface of strut 382. Strut flats 383 and gallery opening 380 may facilitate connection of stem 370 to swirler assembly 351.

Stem 370 may also include fuel boss 377 and pilot boss 376. Fuel boss 377 may extend from flange 375 in the direction opposite center body 372. Pilot boss 376 may extend from fuel boss 377. In some embodiments, pilot boss 376 may extend directly from flange 375. One or more fittings, such as fittings 355 and 356 attach to stem 370 to provide fuel and fluids from a fuel or fluid source to injector 350.

Figure 5:
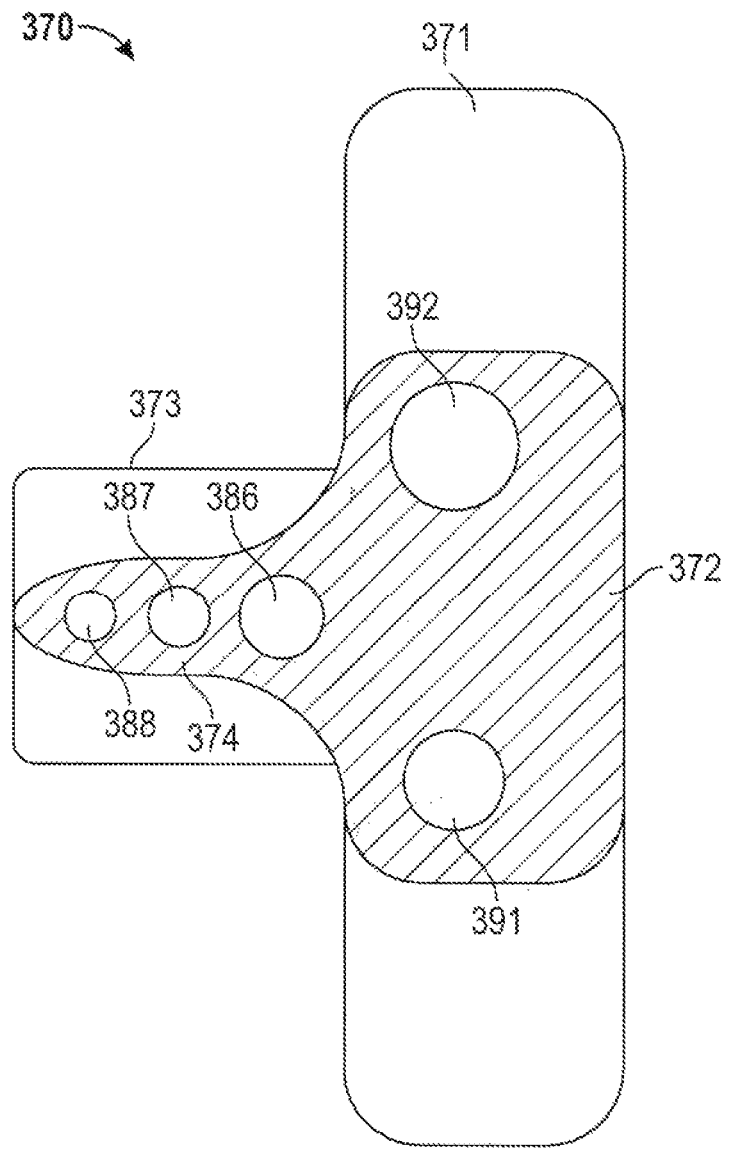
FIG. 5 is a cross-sectional view through the center body and the pilot body of the fuel injector stem of FIGS. 2, 3, and 4.

FIG. 5 is a cross-sectional view through the center body 372 and pilot body 374 of the stem 370 of FIGS. 2, 3, and 4. Referring now to FIGS. 3, 4, and 5 stem 370 may include gas main passage 391, liquid main passage 392, liquid pilot passage 386, gas pilot passage 387, and air assist passage 388. Gas main passage 391 and liquid main passage 392 may each start at fuel boss 377 and extend through flange 375, center body 372, and a portion of gas gallery 371 to gallery opening 380. In some embodiments, gas main passage 391 and liquid main passage 392 each start at flange 375.

Liquid pilot passage 386, gas pilot passage 387, and air assist passage 388 may each start at pilot boss 376 and extend through flange 375, pilot body 374, and a portion of pilot funnel 373 to pilot opening 381. In some embodiments, liquid pilot passage 386, gas pilot passage 387, or air assist passage 388 starts at fuel boss 377. In other embodiments, liquid pilot passage 386, gas pilot passage 387, or air assist passage 388 starts at flange 375. Pilot boss 376 may include fitting passage 393. Fitting passage 393 extends through the side of pilot boss 376 and connects to liquid pilot passage 386, gas pilot passage 387, or air assist passage 388. Fittings for liquid pilot passage 386, gas pilot passage 387, and air assist passage 388 may be too large to all connect directly to the passages at the top of pilot boss 376. Fitting passage 393 may facilitate connection of one of the fittings on the side of pilot boss 376, while the other fittings may connect at the top of pilot boss 376. In some embodiments, pilot boss 376 includes more than one fitting passage 393. Any of the fluid passages such as liquid pilot passage 386, gas pilot passage 387, and air assist passage 388 connected to fitting passage 393 may extend into pilot boss 376, may be capped above the fitting passage 393, and may not extend completely through pilot boss 376. While the embodiment shown in FIGS. 3-5 include the five fluid passages described above, stem 370 may include any number of fluid passages. In one embodiment, stem 370 includes a single fluid passage for liquid or gas fuel.

In the embodiment shown, center body 372 is an elongated solid with a rounded rectangle cross-section. Gas gallery 371 is a ring shape with gallery opening 380 and rounded edges. In the embodiment shown, the ring shape of gas gallery 371 is a hollow cylinder. Gallery opening 380 is a circular opening. A front lip 394 extends from the cylindrical ring at the front cap/base of the cylindrical ring towards the center of gallery opening 380 and a back lip 395 from the cylindrical ring at the back cap of the cylindrical ring towards the center of gallery opening 380. In other embodiments, center body 372, gas gallery 371, and gallery opening 380 may have other shapes and cross-sections.

In the embodiment shown, pilot body 374 extends out from center body 372 forming a T-shaped cross-section. Pilot body 374 has an elliptical shape that rounds into center body 372. Strut 382 also includes an elliptical shape. In other embodiments, pilot body 374 and strut 382 may have other shapes and cross-sections. Some embodiments may not include pilot body 374; strut 382 may extend directly from center body 372.

Referring to FIG. 5, the length or thickness of center body 372 and gas gallery 371 may be the same or similar relative to the axial direction of the cylindrical shape of gas gallery 371. Center body 372 and gas gallery 371 may also be aligned relative to the axial direction of gas gallery 371. Pilot body 374 and pilot funnel 373 may have the same or similar length relative to the axial direction of gas gallery 371 and be aligned relative to the same axial direction.

In the embodiment shown, stem 370 is a single integral piece that includes center body 372, pilot body 374, strut 382, gas gallery 371, pilot funnel 373, flange 375, pilot boss 376, and fuel boss 377. Some embodiments may not include pilot body 374, pilot funnel 373, pilot boss 376, or fuel boss 377.

Referring again to FIG. 2, swirler assembly 351 may be surrounded by and fit into gas gallery 371. Swirler assembly may abut pilot funnel 373. The connection between the stem 370 including the gas gallery 371 and the pilot funnel 373 with the mating pieces including the swirler assembly 351 may keep the fluids segregated as the fluids exit the stem 370 and may only allow the fluids to mix at the fluid injection points.

Figure 6:
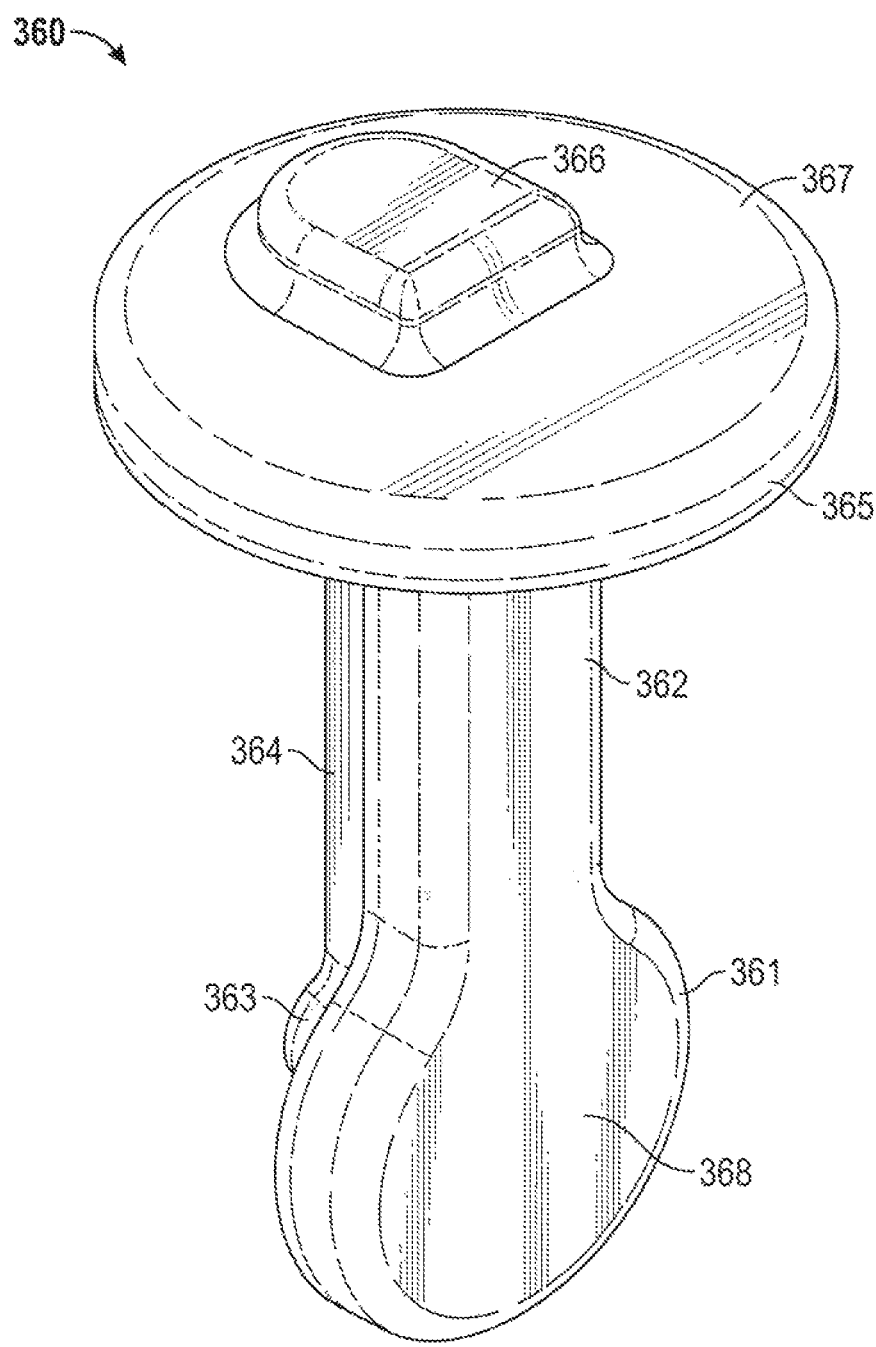
FIG. 6 is a perspective view of a forged workpiece used in the manufacture of the fuel injector stem of FIGS. 2-5.
Figure 7:
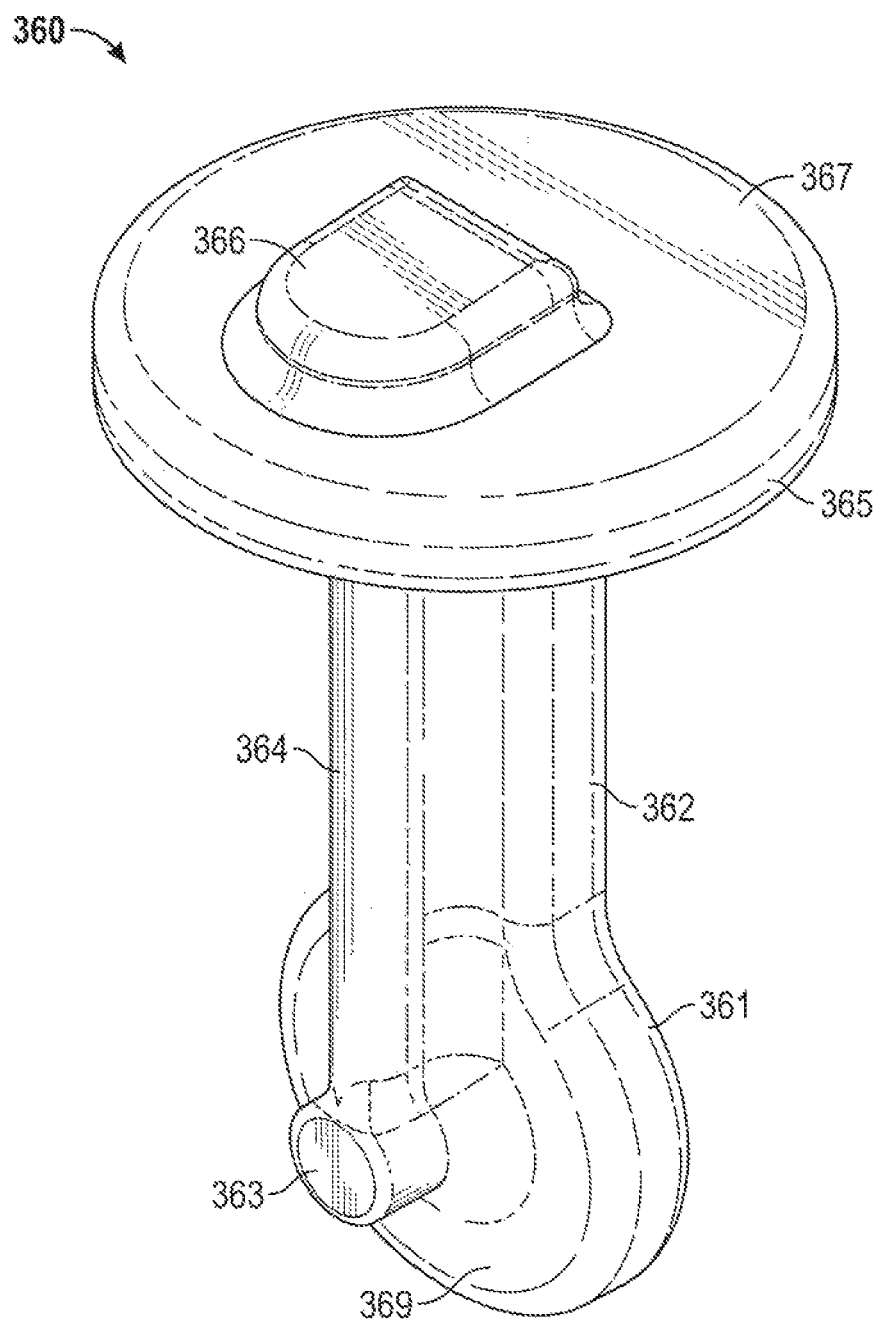
FIG. 7 is another perspective view of the forged workpiece of FIG. 6.

FIG. 6 is a perspective view of a forged workpiece 360 used in the manufacture of stem 370 of FIGS. 2-5. FIG. 7 is another perspective view of forged workpiece 360. Forged workpiece ("workpiece") 360 includes top disk 365, body 362, and lower disk 361. Top disk 365 is a cylindrical shape. Top disk 365 may include tapered portion 367 where the radius of a portion of top disk 365 reduces like a conical frustum.

Body 362 extends from a cap of the cylindrical shape of top disk 365. Body 362 may be a cuboid extending perpendicular to the cap it extends from. In one embodiment, the edges of the cuboid are rounded. Lower disk 361 is located adjacent body 362, distal to top disk 365. Lower disk 361 is a cylindrical shape. Lower disk 361 is oriented transverse or crosswise to top disk 365. The thickness of lower disk 361 may be the same or similar to the thickness of body 362. In one embodiment, the edges of the cylindrical shape of lower disk 361 are rounded. One side of body 362 may align with a cap of lower disk 361 to form a workpiece front 368. The opposite side of body 362 may align with the opposite cap of lower disk 361 to form a workpiece back 369.

Workpiece 360 may also include top protrusion 366, cylindrical protrusion 363, and body protrusion 364. Top protrusion 366 extends out from top disk 365 in a direction opposite body 362. In the embodiment shown, top protrusion 366 is a solid with an extended half round cross-section. In other embodiments, top protrusion 366 may be a cylinder, a cuboid, or other solid shapes. The edges and corners of top protrusion 366 may be rounded. Top protrusion 366 may be offset from the center of top disk 365.

Cylindrical protrusion 363 extends from lower disk 361 in the axial direction of lower disk 361 with a cylindrical shape. Cylindrical protrusion 363 may extend from the workpiece back 369. Cylindrical protrusion 363 has a smaller radius than lower disk 361. The axis of cylindrical protrusion 363 may align with the axis of lower disk 361. The edges of cylindrical protrusion 363 and the corners between cylindrical protrusion 363 and lower disk 361 may be rounded.

Body protrusion 364 extends out from body 362. Body protrusion 364 may extend from the workpiece back 369. A portion of body protrusion 364 may extend out from lower disk 361. Body protrusion 364 may extend in a radial direction of top disk 365 and may extend out to align with top protrusion 366 in the axial direction of top disk 365. Body protrusion 364 may run from top disk 365 to cylindrical protrusion 363. Cylindrical protrusion 363 may be a cuboid, a triangular prism, or a solid with an extended half round or elliptical cross-section.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys. In one embodiment, stem 370 is made from a low carbon stainless steel such as 316L.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Referring to FIG. 2, fuel is supplied to the combustor via supply lines that are connected to fittings, such as fittings 355 and 356. Either a gas fuel or liquid fuel is supplied to gas main passage 391 or liquid main passage 392 respectively. Fuel and air 10 may be swirled/mixed, in swirler assembly 351 and pass into barrel 352 that injects the air 10 and fuel mixture into the combustion chamber 390. The air 10 and fuel mixture is combusted in the combustion chamber 390. Energy is extracted from the combustion reaction via the turbine 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (e.g., to reduce harmful emissions, and/or to recover beat from the exhaust gas 90).

Injectors 350 and in particular injector stems may be complex and expensive to manufacture. Injector stems may include multiple pieces such as a gas gallery, a stem bar, multiple bar tubes, and a flange. The separate injector stem parts may be brazed together, often in several braze cycles. These contacts between injector stem parts may be affected by the thermal growth of the separate parts.

Stem 370 is forged and machined and integrates the various parts of an injector stem into a single piece, which may reduce the complexity and the manufacturing cost. Stem 370 may not need any brazing and may reduce the overall assembly time of injectors 350. The single piece of stem 370 may reduce the effects of thermal growth.

Figure 8:
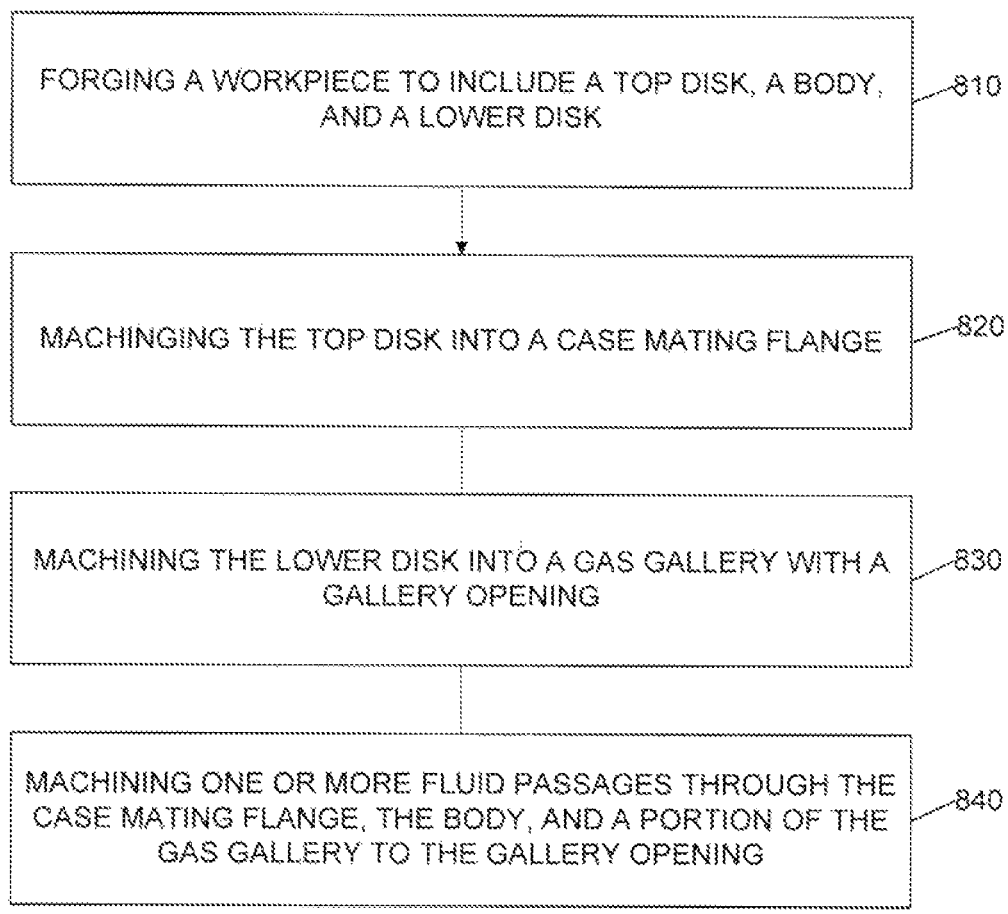
FIG. 8 is a flowchart of a method for manufacturing the fuel injector stem of FIGS. 2-5.

FIG. 8 is a flowchart of a method for manufacturing stem 370 of FIGS. 2-5. Referring to FIGS. 6 and 7, the method includes forging workpiece 360 to include top disk 365, body 362, and lower disk 361 at step 810. In some embodiments, step 810 also includes forging workpiece 360 to include top protrusion 366, cylindrical protrusion 363, and body protrusion 364.

Referring to FIGS. 3, 4, 6, and 7, step 810 is followed by machining top disk 365 into flange 375 at step 820. Step 820 may include machining mounting holes 384 about flange 375 and machining handle holes 385. In the embodiment shown in FIGS. 3 and 4, flange 375 includes eight mounting holes 384 and four handle holes 385.

Step 810 is followed by machining lower disk 361 into gas gallery 371 at step 830. Step 830 may include forming the ring shape of gas gallery 371 by removing material for gallery opening 380. Step 830 may also include forming front lip 394 and back lip 395.

Step 810 is also followed by machining one or more fluid passages through flange 375, body 362 or center body 372, and a portion of gas gallery 371 to gallery opening 380 at step 840. In the embodiment shown in FIGS. 3 and 4, the passages machined include gas main passage 391 and liquid main passage 392. Gas pilot, liquid pilot, and air assist passages may also be included.

Step 810 may be followed by machining body 362 into center body 372. In some embodiments, body 362 may be forged into the shape of center body 372; in these embodiments no machining may be necessary to form the shape of center body 372.

Step 810 may also be followed by machining top protrusion 366 into pilot boss 376, machining cylindrical protrusion 363 into pilot funnel 373, and machining body protrusion 364 into pilot body 374. Machining top protrusion 366 into pilot boss 376 may include machining the cylindrical shape of pilot boss 376 and machining liquid pilot passage 386, gas pilot passage 387, and air assist passage 388 through pilot boss 376. Fitting passage 393 may also be machined into pilot boss 376 and connected to one of the passages.

Machining cylindrical protrusion 363 into pilot funnel 373 may include machining the cylindrical shape of pilot funnel 373 and machining pilot opening 381. Pilot opening 381 may extend into pilot funnel 373 to where liquid pilot passage 386, gas pilot passage 387, and air assist passage 388 may connect to pilot funnel 373.

Machining body protrusion 364 into pilot body 374 may include machining pilot body 374 into a solid with an elliptical cross-section that rounds into cuboid shape of center body 372, machining strut 382, which extends into gallery opening 380, and machining strut opening 383. Machining body protrusion 364 into pilot body 374 may also include machining liquid pilot passage 386, gas pilot passage 387, and air assist passage 388 through pilot body 374 to pilot opening 381.

Forging the workpiece 360 may be performed by forging processes such as precision forging or die forging. Machining workpiece 360 into stem 370 may be performed by machining processes such as CNC Turning (CNC Lathe) Manual Turning (Engine Lathe), CMC 3 Axis Milling, 5 Axis Milling, Mill Turn Machining, and Electric Discharge Machining (EDM).

It is understood that the steps disclosed herein (or parts thereof) may be performed in the order presented or out of the order presented, unless specified otherwise. For example, machining top disk 365 into flange 375 may be performed before or after machining lower disk 361 into gas gallery 371.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular fuel injector and fuel injector stem, it will be appreciated that the fuel injector and fuel injector stem in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A forged and machined fuel injector stem for a gas turbine engine, the fuel injector stem comprising:
    a flange defining a plurality of mounting holes and a handle hole, the flange having a cylindrical shape with a base, a flange axis extending perpendicular to the base and defining an axial direction;
    a center body extending from the base of the flange in the axial direction of the flange, the center body having a solid shape with a rounded rectangle cross-section;
    a gas gallery connected to the center body distal to the flange, the gas gallery having a hollow cylinder shape with a gas gallery axis oriented crosswise to the flange axis, a hollow portion of the gas gallery hollow cylinder shape defining a gallery opening;
    a pilot body extending from the center body in a radial direction of the flange, the radial direction of the flange being transverse to the axial direction of the flange, wherein the center body and the pilot body form a t-shaped cross section;
    a pilot funnel connected to the pilot body, the pilot funnel defining a hollow cylinder shape with a pilot axis, the pilot funnel being offset from the gas gallery along the radial direction of the flange, the pilot axis being aligned with the gas gallery axis, a hollow portion of the pilot funnel hollow cylinder shape defining a pilot opening;
    a gas main passage extending through the flange, the center body, and the hollow portion of the gas gallery, the gas main passage being in flow communication with the gallery opening;
    a liquid main passage extending through the flange, the center body, and the hollow portion of the gas gallery, the liquid main passage being in flow communication with the gallery opening and being adjacent to the gas main passage;
    a gas pilot passage extending through the flange, the pilot body, and the hollow portion of the pilot funnel, the gas pilot passage being in flow communication with the pilot opening; and
    a liquid pilot passage extending through the flange, the pilot body, and the hollow portion of the pilot funnel, the liquid pilot passage being in flow communication with the pilot opening and being adjacent to the gas pilot passage,
    wherein the flange, the center body, the gas gallery, the pilot body, and the pilot funnel are forged and machined from a single workpiece.

2. The fuel injector stem of claim 1, further comprising:
    a pilot boss extending from the flange in a direction opposite the center body, wherein the gas pilot passage and the liquid pilot passage extend into the pilot boss.

3. The fuel injector stem of claim 1, further comprising:
    an air assist passage extending through the flange, the pilot body, and the hollow portion of the pilot funnel, the air assist passage being in flow communication with the pilot opening and being adjacent to the liquid pilot passage.

4. The fuel injector stem of claim 1, wherein the pilot body includes an elliptical cross-section that rounds into the center body.

5. The fuel injector stem of claim 4, wherein the gas gallery is a hollow circular cylinder and includes a cylindrical surface extending from a front lip to a back lip of the hollow circular cylinder along a direction parallel to the gas gallery axis.

6. The fuel injector stem of claim 1, wherein a thickness of the gas gallery matches and aligns with a thickness of the center body along a direction parallel to the gas gallery axis, and
    a thickness of the pilot funnel matches and aligns with a thickness of the pilot body along a direction parallel to the pilot axis.

7. A fuel injector comprising the fuel injector stem of claim 1, the fuel injector further comprising:
    a swirler assembly coupled to the gas gallery and being in flow communication with at least one of the gas main passage, the liquid main passage, the gas pilot passage, and the liquid pilot passage;

a barrel coupled to the swirler assembly, the barrel including a barrel end;
a fitting coupled to the flange, the fitting being in flow communication with a fluid source and at least one of the gas main passage, the liquid main passage, the gas pilot passage, and the liquid pilot passage; and
a handle coupled to the flange at the handle hole.

8. The fuel injector of claim 7, wherein the gas gallery fits around the swirler assembly.

9. The fuel injector stem of claim 1, wherein a thickness of the gas gallery matches and aligns with a thickness of the center body along a direction parallel to the gas gallery axis.

10. The fuel injector stem of claim 1, wherein a thickness of the pilot funnel matches and aligns with a thickness of the pilot body along a direction parallel to the pilot axis.

11. A fuel injector stem for a gas turbine engine, the fuel injector stem comprising:
a single piece of material having
a flange defining a plurality of mounting holes and a handle hole, the flange including a cylindrical shape with a flange axis extending between a top cap and a bottom cap,
a center body extending from the bottom cap of the flange in an axial direction of the flange, the axial direction of the flange extending parallel to the flange axis,
a gas gallery adjacent to the center body and distal from the flange, the gas gallery including a ring shape oriented transverse to the flange, the gas gallery defining a gallery opening, and
a fluid passage extending through the flange, the center body, and the gas gallery, the fluid passage being in flow communication with the gallery opening,
a thickness of the gas gallery matching and aligning with a thickness of the center body along a direction parallel to a longitudinal axis of the gas gallery.

12. The fuel injector stem of claim 11, wherein the fluid passage is a gas main passage,
the single piece of material further having a liquid main passage extending through the flange, the center body, and the gas gallery, the liquid main passage being in flow communication with the gallery opening and being adjacent to the gas main passage.

13. The fuel injector stem of claim 11, wherein the center body includes a cuboid shape.

14. The fuel injector stem of claim 13, wherein edges of the cuboid shape of the center body and edges of the ring shape of the gas gallery are rounded.

15. The fuel injector stem of claim 11, wherein the gas gallery is a hollow cylinder and includes a cylindrical surface extending from a front lip to a back lip of the hollow cylinder along a direction parallel to a longitudinal axis of the gas gallery.

16. A fuel injector comprising the fuel injector stem of claim 11, the fuel injector further comprising:
a swirler assembly coupled to the gas gallery and being in flow communication with the fluid passage;
a barrel coupled to the swirler assembly, the barrel including a barrel end;
a fitting coupled to the flange, the fitting being in flow communication with the fluid passage and with a fluid source; and
a handle coupled to the flange at the handle hole.

17. The fuel injector of claim 16, wherein the gas gallery fits around the swirler assembly.

* * * * *